United States Patent [19]

Shibayama et al.

[11] 4,025,037

[45] May 24, 1977

[54] PROCESS FOR SOLDERING AN ELECTROCOATED SUBSTRATE

[75] Inventors: Kyoichi Shibayama; Hiroshi Ono; Eiki Jidai; Hideo Saeki, all of Amagasaki, Japan

[73] Assignee: Mitsubishi Denki Kabushiki Kaisha, Tokyo, Japan

[22] Filed: May 28, 1975

[21] Appl. No.: 581,621

Related U.S. Application Data

[63] Continuation of Ser. No. 522,763, Nov. 11, 1974, abandoned.

[30] Foreign Application Priority Data

Nov. 10, 1973 Japan .............................. 48-126994

[52] U.S. Cl. .............................. 228/214; 228/901; 204/181
[51] Int. Cl.² .................... B23K 1/02; C25D 13/06
[58] Field of Search .................... 260/80.3 N, 80.73; 228/205, 214, 203; 204/181; 29/626

[56] References Cited

UNITED STATES PATENTS

| | | | |
|---|---|---|---|
| 2,930,117 | 3/1960 | Wilson | 228/214 X |
| 2,963,392 | 12/1960 | Dahlgren | 228/205 X |
| 2,994,676 | 8/1961 | Kucsan et al. | 260/80.73 X |
| 3,362,844 | 1/1968 | Christenson et al. | 260/80.73 |
| 3,471,388 | 10/1969 | Koral | 204/181 |
| 3,535,293 | 10/1970 | Anderson | 260/80.73 X |
| 3,714,078 | 1/1973 | Gordon et al. | 260/80.73 |
| 3,891,526 | 6/1975 | Masuda et al. | 204/181 |

*Primary Examiner*—Howard S. Williams
*Attorney, Agent, or Firm*—Oblon, Fisher, Spivak, McClelland & Maier

[57] ABSTRACT

A process for soldering a metal substrate coated with an electrodeposited non-peelable coating comprising 35–65 wt parts of methacryl ester, 10–40 wt parts of acrylonitrile, 2–15 wt parts of methacrylic acid, 3–10 wt parts of acrylamide and/or vinyl acetate, in 100 parts of resin.

5 Claims, No Drawings

PROCESS FOR SOLDERING AN ELECTROCOATED SUBSTRATE

This is a division of application Ser. No. 522,763, filed Nov. 11, 1974 now abandoned.

BACKGROUND OF THE INVENTION

1. Field of the Invention

The present invention relates to a non-peelable, solderable coating for metals, which is produced by electrodeposition of a water-dispersion varnish.

2. Description of the Prior Art

Organic coatings are applied to the surfaces of metals for a wide variety of reasons, such as to provide electrical insulation, to obtain corrosion resistance, to protect the metal against certain types of mechanical injury, or in the preparation of a wide variety of industrial products. In applying organic coatings, one of the more commonly used techniques is electrodeposition. Other common techniques include tumbling coating, electrostatic coating and the like.

Electrodeposition is an especially desirable technique when the coating being applied is varnish. Since the resulting coating is quite uniform without pin holes, the technique is easily automated and since no organic solvents are necessary, there is a considerable reduction in health and safety hazards as compared with the techniques for coating varnish.

In the electrodeposition of a varnish, a water soluble type paint is first prepared using a resin which has good membrane forming qualities. The molecular weight of the resin is usually in the several thousand range, and often, the resin will have some dissociating group. Such water soluble resin type varnishes provide very high covering performance, even for metallic articles of intricate shapes.

Heretofore however, the thickness of the coating has been somewhat limited, and has generally been restricted to coatings of only a few more microns.

If electrodeposition is to be successfully carried out, it is essential that the polymer used in forming the varnish have dissociated groups in the polymer chain, otherwise the varnish cannot act as an electrolyte and hence the electrode-position will not proceed. Because of the dissociated groups however, the water soluble varnishes provide generally non-uniform electrical characteristics, and hence they are unsuitable for use as electrical insulation.

The applicants have now developed a new resin for use in forming an electrodeposition varnish, which has a relatively small number of dissociated groups, as compared with prior art resins. The resin of this invention can be used to prepare coated membranes which are characterized by excellent mechanical properties, good chemical resistance, good water resistance, and good electrical characteristics, such as volume resistivity and breakdown voltage. The resin of this invention can further provide a quite thick coating, although it does suffer the disadvantage that the coatings produced on intricate shaped substrates are often somewhat non-uniform.

Heretofore, polyurethane has been used to coat wires used for home electrical equipment and communication equipment, such as television and radio circuits. The main reason for the use of polyurethane coated wire is that it is highly solderable and will not peel readily from the wire. Moreover, it possesses good solderability which is important for these applications.

A need exists therefore for a varnish which can be used to provide relatively thick coatings, which is highly solderable and will not peel readily from the substrate surfaces, and which does not provide the disadvantages normally resulting from the use of a resin varnish wherein the resin has a large number of dissociated groups.

SUMMARY OF THE INVENTION

Accordingly, it is one object of the present invention to provide a process for preparing a water-dispersion varnish which can be used for electrodeposition to form non-peelable solderable coatings, wherein the coated product can be used for such applications as the coating of electrical wire.

These and other objects of this invention, as will hereinafter become more readily apparent from the following description have been attained by emulsion-copolymerization of a methacrylic ester, acrylonitrile, methacrylic acid and one or both of an acrylamide and a vinylacetate.

DETAILED DESCRIPTION OF THE PREFERRED EMBODIMENTS

The present invention refers, in one aspect, to a method of forming an insulating coat which can be prepared by an electrodeposition process. The resulting coating of this invention is characterized by quite high solderability, and hence is particularly useful for coating of electrical wire.

The water dispersion varnish of this invention can be prepared by emulsion-copolymerization of a methacrylic ester, acrylonitrile, a methacrylic acid, and one or both of an acrylamide and a vinyl acetate. The characteristic features of this invention are as follows:

1. The presence of the methacrylic ester which is quite easily thermally decomposed, imparts to the polymer a high degree of solderability. It has not been found to give a clear relative relationship between the thermal decomposing property of the methacrylic ester and the cut through temperature and scrape abrasion resistance of the coat prepared by using a water-dispersion varnish of the resulting copolymer thereof. Accordingly, it is quite important to find the optimum combination of one or more methacrylic ester for imparting high solderability and balanced properties.

2. The presence of nitrile imparts a higher degree of chemical resistance to the polymer.

3. The presence of the acrylamide and/or the vinyl acetate provides high cut through temperature and high scrape resistance.

4. The methacrylic acid imparts to the polymer the capability of being easily electrodeposited, and also enhances the appearance of the product.

Suitable methacrylic esters used in the invention include iso-butyl methacrylate, sec-butyl methacrylate, n-butyl methacrylate, n-propyl methacrylate, ethyl methacrylate, iso-propyl methacrylate, n-octyl methacrylate, n-hexyl methacrylate, tert-butyl methacrylate, n-amyl methacrylate, iso-amyl methacrylate, n-heptyl methacrylate and methyl methacrylate.

Suitable acryl-amides which may be used in the invention include N-n-butoxymethyl acrylamide, N-ethoxymethyl acrylamide, N-n-propoxymethyl acrylamide and N-n-butoxyethyl acrylamide. It is especially preferable to use N-n-butoxymethyl acrylamide as the acryl amide component.

The ratio of the comonomers used in the emulsion-copolymerization is 35-65 wt parts of a methacrylic ester, 10-40 wt parts of acrylonitrile, 2-15 wt parts of methacrylic acid and 3-30 wt parts of one or both of acrylamide and vinyl acetate to prepare 100 wt parts of the polymer. The copolymers prepared by the process of the invention have an average molecular weight of 10,000 – 500,000, preferably 50,000 – 200,000 as measured by a viscosity method in formamide.

The electrodeposited coating prepared from a water-dispersion varnish prepared by emulsion-copolymerization of the above comonomers is characterized by quite high solderability, high scrape abrasion resistance, high cut through temperature and a balance in characteristics which are quite suited for the enameling of electrical wire.

If the methacrylic ester is used in an amount higher than the above ratio, the cut through temperature of the electrodeposited coating will be decreased, and the scrape abrasion resistance will be decreased. On the other hand, if the ratio of methacrylic ester used is low, the solderability of the resulting coating product will be decreased. If the quantity of acrylonitrile used is high, solderability will be decreased. On the other hand, the use of less acrylonitrile will result in a decrease in cut through temperature of the resulting membrane and a decrease in chemical resistance. If the quantity of the acrylamide and/or vinyl acetate is too high, solderability will be decreased and the appearance of the coated membrane will be inferior. Also, the quantity of pin holes will be increased. On the other hand, when the acrylamide and/or vinyl acetate is used in a lower ratio, the cut through temperature of the membrane will be decreased, and the scrape abrasion resistance will be decreased. When the methacrylic acid is used in a higher ratio, the scrape abrasion resistance and electrical characteristics will be decreased. On the other hand, when the methacrylic acid is used in a lower ratio, the electrodepositing efficiency will be decreased, and the appearance of the membrane will be inferior.

In the practice of the present invention, water, the comonomers, an emulsifier and a polymerization initiator, are charged to a reaction vessel, and the mixture is heated to the reaction temperature while stirring. This results in emulsion copolymerization. The reaction should be carried out at a temperature of 50–80° C for 1–10 hours. The emulsifier can be a nonionic, anionic or cationic surfactant. From the viewpoint of the efficiency of electrodeposition of a water dispersion varnish, it is preferable to use an anionic surfactant to satisfy at least part of the surfactant requirements.

Suitable anionic surfactants include sodium-dodecylbenzene sulfonate, sodium lauryl sulfate, sodium decylsulfate, sodium palmitate, sodium alkyldiphenylether disulfonate, or the like. Suitable polymerization initiators which can be used to initiate the reaction include the organic peroxides, inorganic peroxides, azo compounds, or the like. In the components of the varnish of the invention, the only methacrylic acid is an ionizable monomer.

In order to improve the electrodeposition efficiency, and the stability of the water dispersion varnish surface charge densities of the latex particles can be increased, and a catalyst such as a redox type catalyst can be used. Suitable redox type catalysts include the combination of potassium persulfate, and sodium bisulfite or the combination of ammonium persulfate and sodium bisulfite. The water dispersion varnish of this invention is coated by electrodeposition onto a metal substrate such as a wire. The coated electrical part can thereafter be soldered with a conventional solder without fear that the coating might peel. The non-peel solderable type coated products of this invention can be prepared by coating the water-dispersion varnish and drying it by various conventional methods. Exemplary of metal substrates which can be coated in this manner include wire, plate, block or the like. The thickness of the coated membrane will be determined depending upon the type of coated products being produced, and is similar to the conventional resin coat. The coated products can be formed by drying the coated varnish at suitable conditions which are similar to the conventional resin coat.

Having generally described the invention, a more complete understanding can be obtained by reference to certain specific examples, which are included for purposes of illustration only and are not intended to be limiting unless otherwise specified.

EXAMPLE 1

Into a flask, 40 wt parts of deionized water was charged and nitrogen was bubbled through water in order to displace the dissolved oxygen. A mixture of 3 wt parts of acrylonitrile, 0.7 wt parts of vinyl acetate, 1.3 wt parts of N-n-butoxyethylacrylamide, 2 wt parts of n-butyl-methacrylate, 2.5 wt parts of methyl methacrylate and 0.5 wt parts of methacrylic acid and 0.1 wt part of sodium laurylsulfate was charged into a reaction vessel and the apparatus was heated to 60° C, and then 0.015 wt part of ammonium persulfate, 0.005 wt parts of sodium bisulfite, dissolved in a small amount of water, were added. Polymerization was allowed to proceed for 4 hours at 75°–80° C in a stream of nitrogen. The coated membrane prepared by electrodepositing the resultant varnish onto a bare copper wire, having a diameter of 0.5 mm, had the following properties:

High flexibility;
High winding characteristics;
No pin-holes;
Solderable at 400° C for 6 seconds;
Cut through temperature; 260° C;
Repeated scrape abrasion; 30 times.

This enameled wire had sufficient characteristics so as to be useable as a replacement for the commonly used polyurethane coated wire in soldering operations.

EXAMPLE 2

A mixture of 2 wt parts of acrylonitrile, 0.5 wt parts of vinylacetate, 1 wt part of N-n-propoxymethyl acrylamide, 3 wt parts of iso-propyl methacrylate, 3 wt parts of methyl methacrylate, 0.5 wt parts of methacrylic acid was emulsion-copolymerized in accordance with the process of Example 1 to form a water dispersion varnish. The coated membrane prepared by electrodepositing the resultant varnish on a bare copper wired having a diameter of 0.5 mm had the following properties:

High winding performance;
No pin holes;
Solderable at 400° C for 5 seconds;
Cut through temperature: 250° C;
Repeated scrape abrasion: 28 times.

This enameled wire had sufficient characteristics so as to be useable as a replacement for polyurethane coated wire.

EXAMPLE 3

A mixture of 3 wt parts of acrylonitrile, 0.5 wt parts of vinyl acetate, 0.5 wt parts of N-n-butoxymethacrylamide, 2.5 wt parts of n-propyl methacrylate, 3 wt parts of ethyl methacrylate and 0.5 wt parts of methacrylic acid was emulsion-copolymerized in accordance with the process of Example 1, to form a water dispersion varnish. The coated membrane prepared by electrodepositing the resultant varnish onto a bare copper wire having a diameter of 0.5 mm, had the following properties:

High winding performance;
No pin holes;
Solderable at 400° C for 4 seconds;
Cut through temperature: 240° C;
Repeated scrape abrasion: 25 times.

This enameled wire had sufficient characteristics so as to be useable as a replacement for polyurethane coated wire.

EXAMPLE 4

A mixture of 2.5 wt parts of acrylonitrile, 0.5 wt parts of vinyl acetate, 1.5 wt parts of N-n-butoxyethylacrylamide, 2 wt parts of ethylmethacrylate, 3 wt parts of methyl methacrylate and 0.5 wt parts of methacrylic acid was emulsion-copolymerized in accordance with the process of Example 1 to prepare a water dispersion varnish. The coated membrane prepared by electrodepositing the resultant varnish on a bare copper wire, having a diameter of 0.5 mm, had the following properties:

High winding performance;
No pin holes;
Solderable at 400° C for 7 seconds;
Cut through temperature: 255° C;
Repeated scrape abrasion: 27 times.

This enameled wire had sufficient characteristics so as to be useable as a replacement for polyurethane coated wire.

EXAMPLE 5

A mixture of 2 wt parts of acrylonitrile, 1.5 wt parts of vinyl acetate, 1 wt part of N-ethoxymethyl acrylamide, 2.5 wt parts of ethyl methacrylate, 2.2 wt parts of methylmethacrylate and 0.8 wt parts of methacrylic acid was emulsion-copolymerized in accordance with the process of Example 1, to prepare a water dispersion varnish. The coated membrane prepared by electrodepositing the resultant varnish on a bare copper wire having a diameter of 0.5 mm had the following properties:

High winding performance;
No pin holes;
Solderable at 400° C for 6 seconds;
Cut through temperature: 245° C;
Repeated scrape abrasion: 30 times.

This enameled wire had sufficient characteristics so as to be useable as a replacement for polyurethane coated wire.

EXAMPLE 6

A mixture of 2 wt parts of acrylonitrile, 4 wt parts of methyl methacrylate; 2 wt parts of ethyl methacrylate; 1 wt part of vinyl acetate; 1 wt part of N-n-butoxymethyl acrylamide and 0.5 wt parts of methacrylic acid was emulsion-polymerized in accordance with the process of Example 1, to prepare a water dispersion varnish. The coated membrane prepared by electrodepositing the resultant varnish on a bare copper wire having a diameter of 0.5 mm had the following properties:

High winding performance;
No pin holes;
Solderable at 400° C for 5 seconds;
Cut through temperature: 250° C;
Repeated scrape abrasion: 23 times.

This enameled wire had sufficient characteristics so as to be useable as replacement for polyurethane coated wire.

EXAMPLE 7

A mixture of 3 wt parts of acrylonitrile, 4 wt parts of methyl methacrylate, 2 wt parts of ethylmethacrylate, 1 wt parts of N-n-butoxymethyl acrylamide and 0.5 wt parts of methacrylic acid was emulsion-polymerized in accordance with the process of Example 1 to prepare a water dispersion varnish. The coated membrane prepared by electrodepositing the resultant varnish on a bare copper wire having diameter of 0.5 mm had the following properties:

High winding performance;
No pin holes;
Solderable at 400° C for 4 seconds;
Cut through temperature: 245° C;
Repeated scrape abrasion: 25 times.

This enameled wire had sufficient characteristics so as to be useable as a replacement for polyurethane coated wire.

EXAMPLE 8

A mixture of 3 wt parts of acrylonitrile, 3 wt parts of methyl methacrylate, 3 wt parts of ethylmethacrylate, 1 wt part of vinyl acetate, and 0.5 wt parts of methacrylic acid was emulsion-copolymerized in accordance with the process of Example 1 to prepare a water dispersion varnish. The coated membrane prepared by electrodepositing the resultant varnish on a bare copper wire having a diameter of 0.5 mm had the following properties:

High winding performance;
No pin holes;
Solderable at 380° C for 4 seconds;
Cut through temperature: 230° C;
Repeated scrape abrasion: 23 times.

This enameled wire had sufficient characteristics so as to be useable as a replacement for polyurethane coated wire.

EXAMPLE 9

A mixture of 4 wt parts of acrylonitrile, 4 wt parts of methyl methacrylate, 2 wt parts of ethylmethacrylate, 1 wt part of vinyl acetate and 0.5 wt parts of methacrylic acid was emulsion-copolymerized in accordance with the process of Example 1, to prepare a water dispersion varnish. The coated membrane prepared by electrodepositing the resultant varnish on a bare copper wire having a diameter of 0.5 mm had the following properties:

High winding performance;
No pin holes;
Solderable at 380° C for 5 seconds;
Cut through temperature: 240° C;

Repeated scrape abrasion: 27 times.

This enameled wire had sufficient characteristics so as to be useable as a replacement for polyurethane coated wire.

In Examples 1–9, the resulting copolymers were separated from the water dispersion varnishes and were dried and dissolved in dimethyl formamide, and the average molecular weights of the copolymers were measured by the conventional viscosity method. The results are as follows:

|  | Average molecular weight |
| --- | --- |
| Example 1 | about 15 × 10$^4$ |
| Example 2 | about 13.5 × 10$^4$ |
| Example 3 | about 15 × 10$^4$ |
| Example 4 | about 15 × 10$^4$ |
| Example 5 | about 13 × 10$^4$ |
| Example 6 | about 15 × 10$^4$ |
| Example 7 | about 15 × 10$^4$ |
| Example 8 | about 14 × 10$^4$ |
| Example 9 | about 15 × 10$^4$ |

REFERENCE 1

In a flask, 40 wt parts of deionized water was charged and nitrogen was bubbled through water in order to displace the dissolved oxygen. A 1 wt part of N-methylolacrylamide was mixed into a mixture of 2 wt parts of acrylonitrile, 1.5 wt parts of vinylacetate, 2 wt parts of ethylmethacrylate, 3 wt parts of methyl methacrylate and 0.5 wt parts of methacrylic acid. The mixture was charged into the flask and sodium laurylsulfate was added thereto. The mixture was heated to 60° C and 0.015 wt parts of potassium persulfate and 0.005 wt parts of sodium hydrogen sulfite, dissolved in a small amount of water were added to the mixture. Polymerization was allowed to proceed at 60°–70° C for 5 hours in a stream of nitrogen. N-methylol acrylamide was not dissolved in the comonomers nor in the water. Therefore, uniform emulsion copolymerization was not performed.

REFERENCE 2

A 1 wt part of acrylamide was dissolved into a mixture of 3 wt parts of acrylonitrile, 1 wt part of vinyl acetate, 2 wt parts of n-butylmethacrylate and 3 wt parts of methylmethacrylate and the mixture was emulsion-copolymerized in accordance with the process of Reference 1 to form a water dispersion varnish. Certain amounts of coagulum were formed. The coated membrane formed by electrodepositing the resultant varnish was found to have a rough surface, but good flexibility. It was solderable at 400° C for 10 seconds without peeling, however, the cut through temperature was 205° C. Accordingly, the coated wire could not be used as a replacement for the currently widely used polyurethane coated wire. The low conversion and low cut through temperature of the films are attributed to the low reactivity of acrylamide.

Having now fully described the invention, it will be apparent to one of ordinary skill in the art that many changes and modification can be made thereto without departing from the spirit or scope of the invention as set forth herein.

What is claimed as new and intended to be covered by letters patent is:

1. In a method of soldering a coated metal substrate, the improvement which comprises applying solder onto said coated metal substrate wherein the coating thereon is an electrodeposited water-dispersed varnish of a copolymer of 30–65 wt. parts of methacrylic ester, 10–40 wt. parts of acrylonitrile, 2–15 wt. parts of methacrylic acid and 3–30 wt. parts of an alkoxyacrylamide, vinyl acetate or a mixture thereof, per 100 parts of said varnish.

2. The method of claim 1 wherein said water-dispersed varnish is prepared by emulsion copolymerization.

3. The method of claim 1, wherein said resin has an average molecular weight of 10,000 – 500,000.

4. The method of claim 1, wherein said alkoxyacrylamide is N-n-butoxymethyl acrylamide, N-ethoxymethyl acrylamide, N-n-propoxymethyl acrylamide or N-n-butoxyethyl acrylamide.

5. The method of claim 1, wherein said methacrylic ester is the iso-butyl, sec-butyl, n-butyl, n-propyl, ethyl, iso-propyl, n-octyl, n-hexyl, tert-butyl, n-amyl, iso-amyl, n-heptyl or methyl ester of methacrylic acid.

* * * * *